Figure 1:
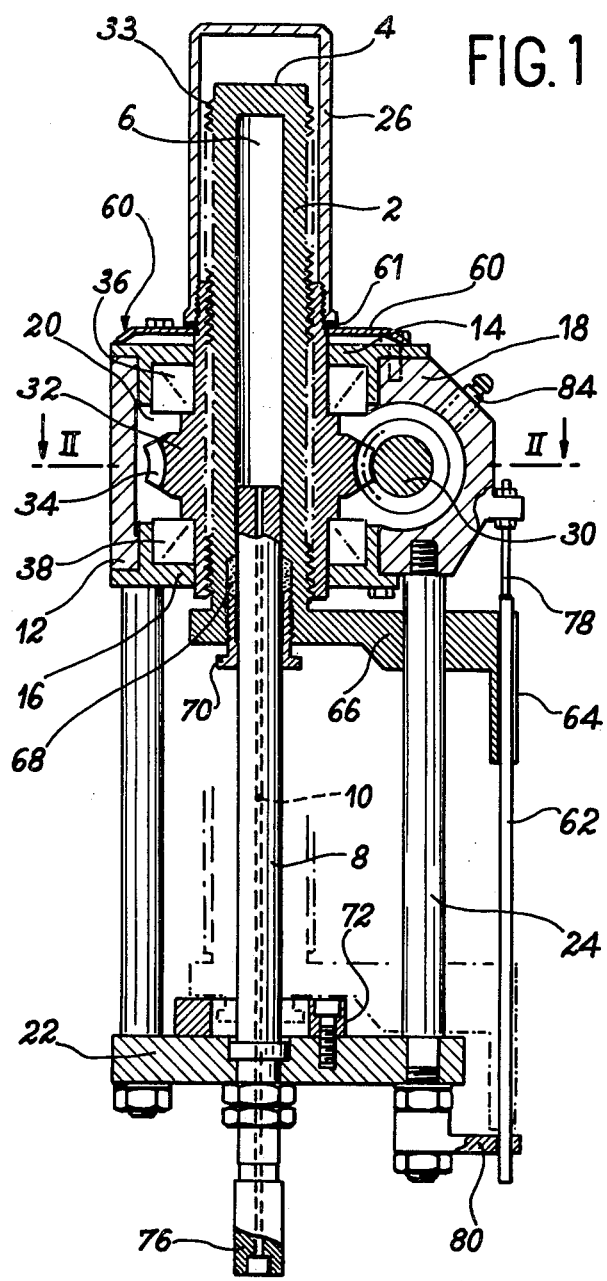

United States Patent [19]

Bimond et al.

[11] 4,207,806
[45] Jun. 17, 1980

[54] MINIATURE VOLUMETRIC PUMP

[75] Inventors: Jean-Pierre Bimond, Pau; Jean-Michel Etcheverria, Biarritz; Flavien Lazarre, Pau; Andre Veron, Serres-Castet, all of France

[73] Assignee: Societe Nationale Elf Aquitaine (Production), Courbevoie, France

[21] Appl. No.: 927,967

[22] Filed: Jul. 26, 1978

[30] Foreign Application Priority Data

Aug. 2, 1977 [FR] France .................. 77 23719

[51] Int. Cl.² ................... F04B 39/00; F01B 13/02
[52] U.S. Cl. .......................... 92/31; 417/63; 417/460
[58] Field of Search ............. 74/424.8; 92/31, 117 R, 92/117 A; 417/460, 63

[56] References Cited

U.S. PATENT DOCUMENTS

| 829,096 | 8/1906 | Carver | 417/460 |
|---|---|---|---|
| 905,640 | 12/1908 | Borchers | 92/117 |
| 1,338,321 | 4/1920 | Moard | 92/117 A |
| 1,857,026 | 5/1932 | Ligon | 92/117 R |
| 2,513,441 | 7/1950 | Allen | 74/424.8 |
| 2,828,722 | 4/1958 | Bohnhoff | 92/117 R |
| 3,133,476 | 5/1964 | Goyer | 92/117 R |
| 3,200,664 | 8/1965 | Mauric | 74/424.8 |
| 3,254,607 | 6/1966 | Norton | 417/460 |
| 3,857,547 | 12/1974 | Profet | 74/424.8 |
| 4,008,981 | 2/1977 | Bouquet | 417/63 |

FOREIGN PATENT DOCUMENTS 2461236 7/1975 Fed. Rep. of Germany ............ 92/31

Primary Examiner—William L. Freeh

[57] ABSTRACT

A miniature volumetric pump for determining the thermodynamic characteristics of oil effluents comprising a hollow cylinder and a piston moving in a straight line relative to the cylinder. The pump is characterized in that the piston is stationary and secured to the pump frame and in that the cylinder can move in a straight line with respect to the frame and is adapted to receive the piston in sealing-tight manner in its bore, the pump comprising a screen device for moving the cylinder.

2 Claims, 2 Drawing Figures

MINIATURE VOLUMETRIC PUMP

The invention relates to a miniature volumetric pump.

More particularly, the invention relates to a pump for introducing an exactly-defined liquid into a chamber at a pressure which can be relatively high, e.g. of the order of 500 bars, the volume being small, e.g. of the order of 25 cm$^3$.

Still more specifically, the pump according to the invention is of the kind used in the oil industry for systems for analyzing the thermo-dynamic characteristics of a gas or liquid effluent.

Hitherto, samples of effluents have been taken at the prospecting site and sent to analytical laboratories, where the analytical systems can be large since they are stationary. Analysis consists mainly in placing a certain volume of a sample of effluent in a heat-insulated chamber and injecting exactly-measured quantities of mercury into the chamber in order to vary the volume and pressure of the effluent. The temperature can also be measured, so as to record various values of the pressure, volume and temperature of the effluent and thus deduce its thermodynamic characteristics.

Volumetric pumps used hitherto have been constructed as follows. The pump comprises a stationary cylinder in which a movable piston can move. The piston movements are produced and controlled by means of a threaded rod co-operating with an inner thread formed in an axial recessed bore in the piston. When the threaded rod rotates, the piston is driven in a straight line. A circular sliding gauge is mounted on the outlet part of the threaded control rod. The control system is suitable for a pump having a relatively large volume, e.g. 250 cm$^3$.

However, to obtain the required pressure and the required accuracy simultaneously, the pumps are relatively voluminous and heavy. In addition, considerable space is required for the piston stroke. Finally, long, delicate operations are required for calibrating the pumps.

The object of the invention is to construct analytical systems which can be transported to the actual prospecting site, more specifically to construct volumetric pumps for such systems. As can easily be seen, prior-art pumps are not suitable for such use on account of their weight and bulk and complexity of operation.

On the other hand, the miniature volumetric pump according to the invention can be used to construct such systems, since its weight and bulk are reduced and it operates on reduced volumes - of the order of 25 cm$^3$ - while still ensuring high accuracy with regard to the volumes injected.

The pump according to the invention comprises:

A stationary frame,

A hollow cylinder having a longitudinal axis,

A piston adapted to move in a straight line along the axis inside the cylinder, and Means for moving the cylinder in a straight line relative to the piston, the cylinder having a threaded lateral outer wall and an inner lateral wall, the piston being secured to the frame and, at its free end, comprising sealing means adapted to co-operate with the inner lateral surface of the cylinder, and an axial bore extending from one end of it to the other, the cylinder-moving means comprising a cylindrical sleeve coaxial with the cylinder, the sleeve being immobilized relative to the frame and pivotably mounted in the frame, the sleeve having an inner lateral surface threaded so as to co-operate with the sleeve thread and an outer lateral surface formed with teeth, an endless screw being pivotably angles to the cylinder axis, the screw being adapted to co-operate with the teeth in the sleeve, and means being provided for rotating the screw.

According to another feature of the preferred embodiment, the endless screw is prevented from moving in a straight line by two abutments mounted in the frame via rings forming cams.

According to another feature, a rotary sliding gauge is mounted at one end of the sleeve.

Figure 2:
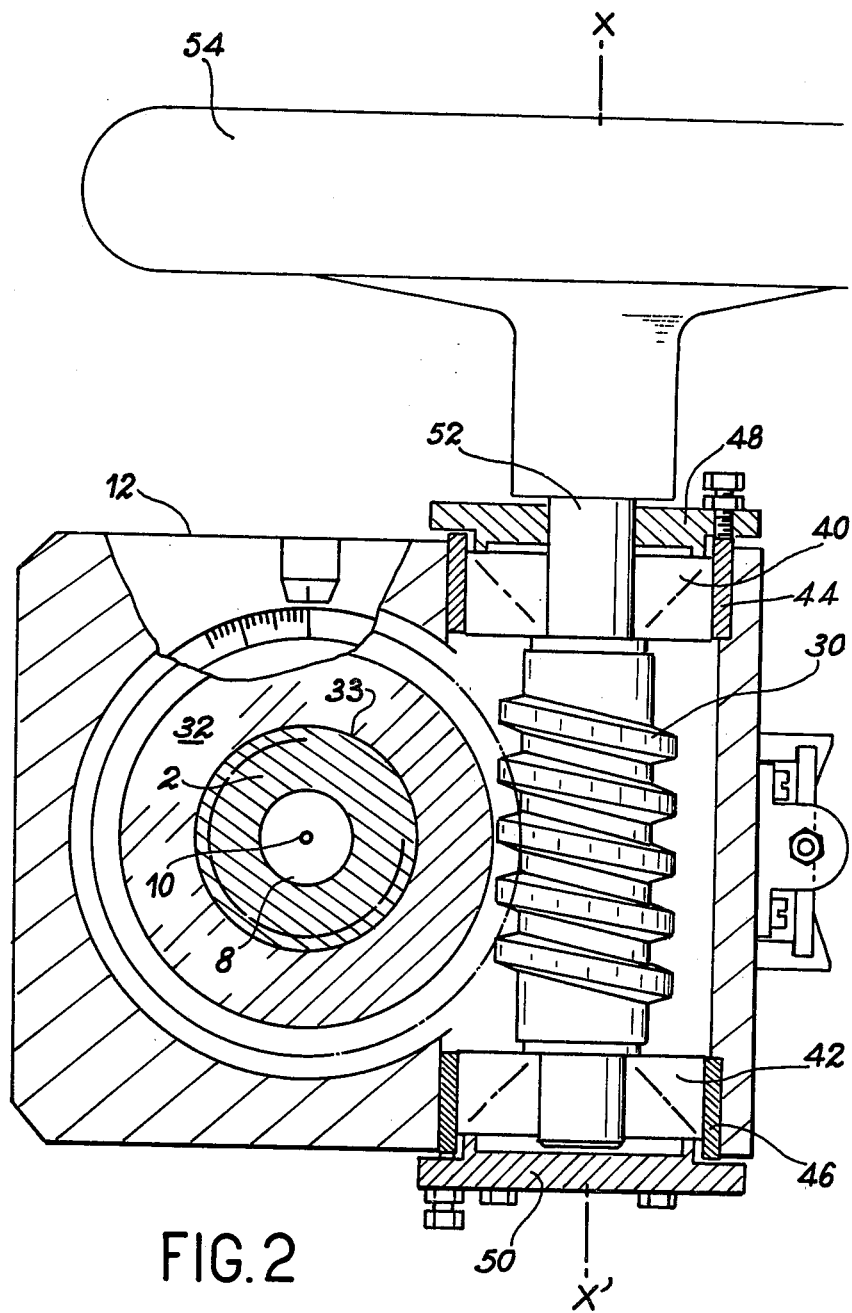

The invention will be more clearly understood from the following description of two embodiments, given by way of non-limitative example. The description refers to the accompanying drawings in which:

FIG. 1 is a horizontal cross-section through the pump according to the invention, and FIG. 2 is a vertical cross-section across the plane II—II in FIG. 1.

As previously stated, the pump mainly comprises a cylinder 2 closed by an end 4 and formed with a cylindrical bore 6 defining the volume of the pump; the pump also comprises a piston 8 formed with a central orifice 10 extending all the way through it. According to one of the main features of the invention, piston 8 is stationary with respect to the pump frame, whereas cylinder 6 can move in a straight line in order to adjust the volume of fluid expelled by the pump. The pump frame mainly comprises a first casing comprising a side wall 12 and covers 14, 16 which are secured together and supplemented by a housing 18 secured to the side of a cavity 20 defined by the first casing. The housing also comprises a bearing plate 22 connected to the previously-mentioned casing by longitudinal guide columns such as 24, which are parallel to the piston 8 (there are three columns in all). The outlet end of piston 8 is secured in plate 22 and extends through it. The housing as previously defined is adapted to surround and guide the moving cylinder 2 and the mechanical means for moving cylinder 2 in straight lines.

The means for moving cylinder 2 mainly comprise an endless screw 30 having an axis perpendicular to that of cylinder 2. Screw 30 co-operates with a wheel 32 bearing outer teeth 34 which engage screw 30. Wheel 32 has an internal thread which co-operates with an external thread 33 formed on the outer surface of cylinder 2. Wheel 32 is prolonged by a cylinder casing 26 surrounding the end of cylinder 2. Cylinder 2 is rotated by two ball-bearing abutments 36, 38 in oblique contact. The bearings are secured by covers 16 and 14. Screw 30 rotates inside two bearings 40, 42 secured to housing 18. Actually, bearings 42 are mounted inside rings 44, 46 forming cams with respect to the axis XX' of the endless screw 30. The operation of rings 44 and 46 has already been explained. The endless screw assembly 30 is supplemented by two covers 48, 50 secured to casing 18. Screw 30 is prolonged by a shaft 52 into which a control handle 54 is fitted by any known means.

A double system of sliding gauges is used to record the motion of the cylinder, i.e. the volume of liquid injected by the pump. The double system comprises, firstly, a graduated rotary sliding gauge 60 secured to cylinder casing 26 by a friction ring 61 and, secondly, a stationary slide or strip 62 disposed parallel to the axis of piston 8. Strip 62 co-operates with a pointer 64 secured to a plate 66 attached to the end of cylinder 2.

Sealing-tightness between piston 8 and cylinder 2 is maintained by a seal 68 clamped against its seat by a plug 70. An annular abutment 72 is secured to the bearing plate 22 in order to limit the cylinder stroke.

Piston 8 terminates in a connecting member 76 for connecting it to a rigid pipe. Similarly, the movable slide or the like 62 is secured to housing 18 via a regulating screw 78. Slide 62 is guided at its bottom end by a holder 80 secured to column 24.

The operation of the pump follows very simply from the preceding description. The endless screw 30 is rotated by moving the control means 54 in the desired direction. Screw 30 rotates wheel 32. The inner thread of wheel 32 co-operates with the outer thread 33 of cylinder 2 so as to move cylinder 12 in a straight line without moving the piston 8.

The advantages of the pump embodiment according to the invention are clear from the preceding description. They relate mainly to the improvement in accuracy made necessary since the pump is miniaturized compared with the existing pumps of the same kind. The improvements relate more particularly to the fact that, compared with the prior art, the thread enabling the piston to move relatively to the cylinder is on the cylinder and not on the piston. Thus, the thread diameter is substantially increased, resulting in greater accuracy during machining. According to another very important feature, the rotary sliding gauge for recording variations in the volume of the pump is directly connected to the moving part.

The endless screw and associated control handle, in co-operation with the wheel driving the cylinder 2, constitute a mechanical amplifier which can be used to obtain high pressures of the order of 500 bars in the pump without it being necessary to apply very great forces to the control means 54. Furthermore, since the cylinder is movable and the piston is stationary, the set of moving parts requiring lubrication is all inside a single relatively compact casing. This simplifies the problems of lubrication, which is supplied by a lubricator 84.

Finally, the mechanical force is applied to the middle of sleeve 32, which itself is in a central position relative to the longitudinal motion of the cylinder. This results in better transmission of force.

The advantages of the novel volumetric pump are such that it is easy to manipulate volumes of fluids of the order of 25 $cm^3$ in order to inject them into various measuring instruments or experimental or other reactors.

We claim:

1. A pump, wherein the sleeve has a rotary sliding gauge at one end, co-operating with a pointer secured to the frame.

2. A miniature volumetric pump comprising, a stationary frame, a hollow cylinder having a longitudinal axis, a piston adapted to move in a straight line along the axis inside the cylinder, and means for moving the cylinder in a straight line relative to the piston, the cylinder having a threaded lateral outer wall and an inner lateral wall, the piston being secured to the frame and having a free end whereat sealing means is adapted to co-operate with the inner lateral wall of the cylinder, said piston having an axial bore extending from one end of it to the other, and said means for moving the cylinder comprising a cylindrical sleeve coaxial with the cylinder, the sleeve being pivotably mounted in the frame and having an inner lateral surface threaded so as to co-operate with the cylinder threaded outer wall and an outer lateral surface formed with teeth, an endless screw pivotably mounted in the frame and having an axis at right angles to the cylinder axis, the screw being adapted to cooperate with the teeth on the sleeve, and means for rotating the screw, said screw being mounted at each end in a bearing forming an abutment, the abutments being mounted in the frame via rings forming cams adapted to modify the distance between the cylinder axis and the axis of the endless screw.

* * * * *